United States Patent

Garzon

[15] 3,676,737
[45] July 11, 1972

[54] GROUND-FAULT DETECTOR USING SQUARE HYSTERESIS LOOP REACTOR CORE

[72] Inventor: Ruben D. Garzon, Malvern, Pa.
[73] Assignee: I-T-E Imperial Corporation, Philadelphia, Pa.
[22] Filed: April 5, 1971
[21] Appl. No.: 131,253

[52] U.S. Cl. ........................... 317/18 D, 317/27 R, 340/255
[51] Int. Cl. .................................... H02h 3/32, H02h 3/16
[58] Field of Search .............. 317/18 D, 18 R, 27 R; 323/56; 324/51, 127; 340/255

[56] References Cited

UNITED STATES PATENTS

| | | | |
|---|---|---|---|
| 3,555,360 | 1/1971 | Lee | 317/18 D |
| 3,396,338 | 8/1968 | Buchanan | 324/127 |
| 3,558,980 | 1/1971 | Florance | 317/18 D |
| 3,539,867 | 11/1970 | Edmunds | 317/18 D |
| 3,566,189 | 2/1971 | Wilson | 317/18 D |

*Primary Examiner*—J. D. Miller
*Assistant Examiner*—Harvey Fendelman
*Attorney*—Ostrolenk, Faber, Gerb & Soffen

[57] ABSTRACT

A ground-fault detector for determining ground-fault currents of less than 5 milliamperes consists of a square hysteresis loop core which is biased by a biasing winding which supplies core loss such that a small change in magnetizing force due to a small current change will cause a large flux change. Two control windings having an identical configuration and connected to induce opposing magnetomotive forces are formed on the core and are connected in series with an input circuit and are connected to opposite sides of a load which might develop a ground fault. An output winding on the core is then connected to an operational amplifier which, in turn, produces a triggering signal output for controlling a circuit interrupter or relay in response to flux change due to a ground-fault current detected as a difference of current in the two control windings.

7 Claims, 3 Drawing Figures

INVENTOR.
RUBEN D. GARZON
BY
Ostrolenk, Faber, Gerb & Soffen
ATTORNEYS 3,676,737

GROUND-FAULT DETECTOR USING SQUARE HYSTERESIS LOOP REACTOR CORE

BACKGROUND OF THE INVENTION

This invention relates to ground-fault detectors, and more specifically relates to a personnel ground-fault protection device which produces an output signal in response to measurement of ground-fault currents of extremely low magnitude, for example, 5 milliamperes.

It has been recognized that serious personnel hazard exists when electrical equipment is unintentionally faulted to ground through a high impedance. Thus, very little fault current would flow which is insufficient to operate the fault-sensing circuits of a circuit breaker, although dangerous electrical potentials are established which can expose personnel to dangerous electrical shocks. By way of example, ground faults of as little as 5 milliamperes would not activate circuit interrupter equipment rated in the order of many amperes.

Many ground-fault indicators are known and frequently use the differential operation of a current transformer having windings connected on the opposite sides of a load. An output winding of the current transformer then operates a relay to de-energize a circuit when a ground fault is measured by the current transformer. In such a system, and to obtain required sensitivity, the current transformer becomes relatively large and the release mechanisms connected to the current transformer must be very sensitive. Therefore, such devices are difficult to manufacture and are unreliable.

BRIEF SUMMARY OF THE INVENTION

The present invention provides a novel ground-fault detector which has considerably reduced size compared to devices of the prior art as well as increased sensitivity and reliability. Moreover, the device can be easily assembled and adjusted to provide desired current levels through the single adjustment of a biasing current.

In accordance with the invention, a current transformer type device is formed with a core of square loop hysteresis material formed in a toroidal shape, and with a biasing winding which supplies magnetizing current and core loss energy, and which biases the core to a condition whereby a relatively small change in magnetizing force will produce a relatively large change in flux density. That is, small changes in magnetizing force need not overcome core loss threshold levels before becoming operative to produce flux density changes.

Two control coils are then formed on the magnetic toroid, which coils are wound to produce opposing magnetomotive forces and which are connected on opposite sides of a load which might develop a ground fault. Under normal conditions, the current into and out of the load will be equal so that the magnetomotive forces of the two coils counteract one another and the coil simply remains in its biased condition without producing any substantial flux change. If, however, a ground fault is developed, the magnetomotive force of one control coil no longer exactly balances the magnetomotive force of the other so that there is a net change in the magnetizing force, thereby to produce a substantially large change in flux density. This large change in flux density is used to generate an output voltage in a suitable output winding formed on the core and this output voltage is then appropriately processed to initiate a protective action, as by the operation of a relay and circuit interrupting equipment associated with the load being monitored. By way of example, the toroid output winding can be connected to an operational amplifier which produces an output signal which, in turn, switches a suitable solid state device such as a transistor, controlled rectifier, triac, or the like.

DETAILED DESCRIPTION OF THE PREFERRED EMBODIMENTS OF THE INVENTION

Figure 1:
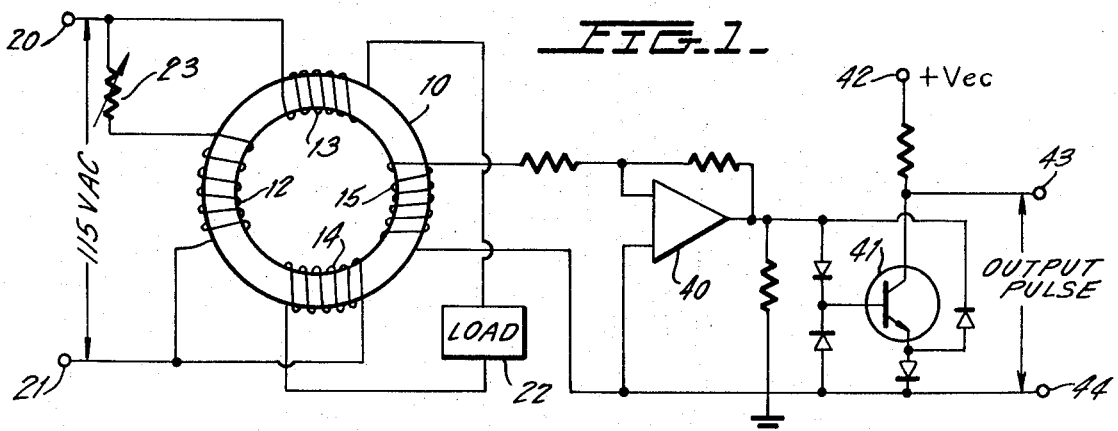
FIG. 1 schematically illustrates a circuit including the magnetic toroid of the invention.
Figure 2:
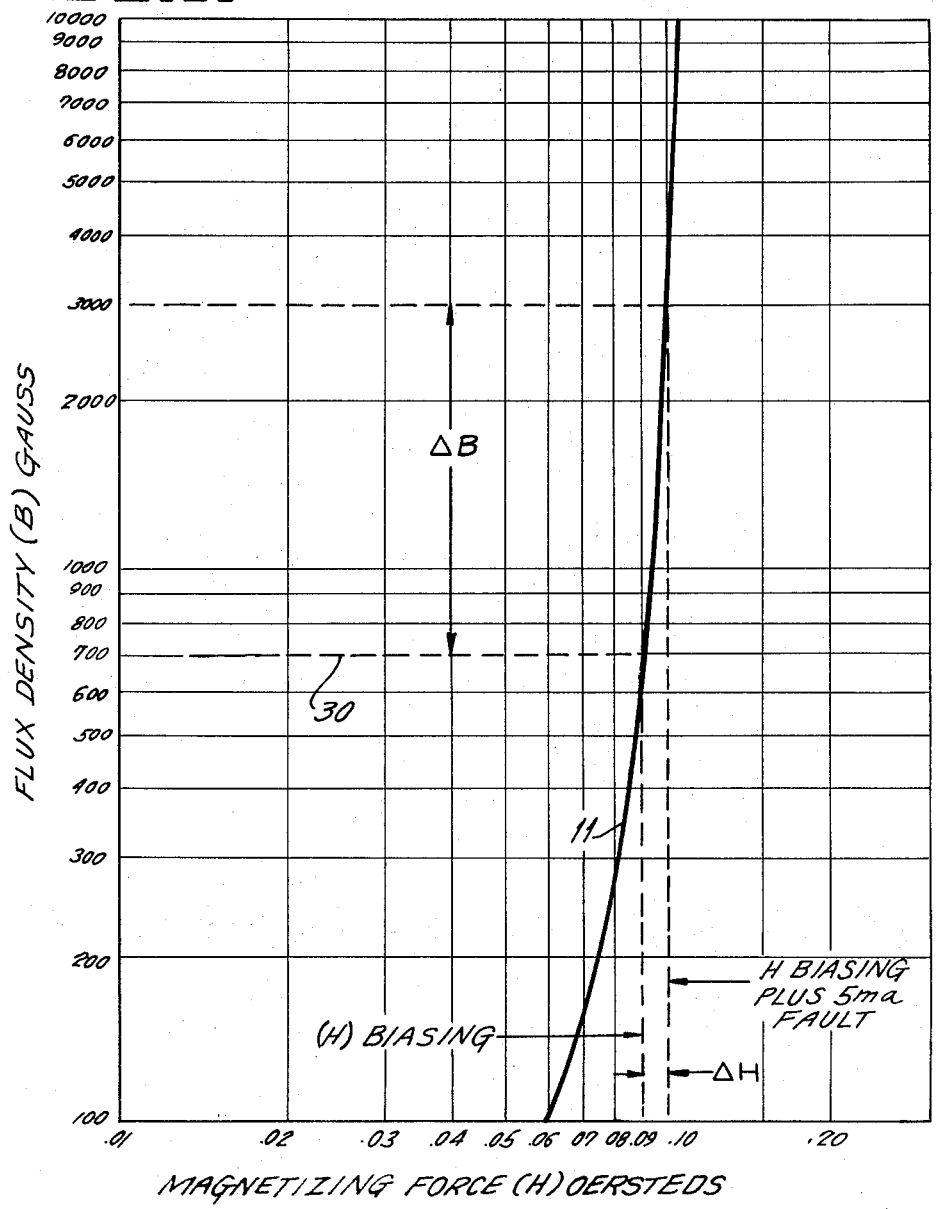
FIG. 2 illustrates a graph of flux density as a function of magnetizing force for the toroidal core of FIG. 1.

Referring first to FIG. 1, there is shown a toroidal magnetic core 10 of a high permeability material which exhibits a relatively square hysteresis loop characteristic. A portion of the square hysteresis loop characteristic is illustrated in FIG. 2 by the solid line 11. Magnetic core 10 is then provided with a biasing winding 12, control windings 13 and 14, and an output winding 15.

In one example of the invention, all of windings 12 to 15 are equally distributed over the entire periphery of core 10 and are, of course, appropriately insulated from one another. Moreover, the windings are so wound that windings 13 and 14 will produce equal and opposite magnetomotive forces, as schematically indicated by the direction of the windings 13 and 14. Typically, winding 12 may consist of 100 turns of No. 26 wire; windings 13 and 14 may consist of 20 turns of No. 16 wire; and winding 15 may consist of 10 turns of No. 26 wire.

FIG. 1 then schematically illustrates terminals 20 and 21 of an input voltage source which can, for example, be 115 volts AC which is to energize a load 22. The biasing winding 12 is connected in series with terminals 20 and 21 through a suitable adjustable resistor 23. The load 22 is connected in series with terminals 20 and 21 and windings 13 and 14, as illustrated.

Biasing winding 12 overcomes the core losses of core 10 and provides a sufficient number of ampere turns to excite core 10 to a point where a small output voltage is continually induced in the output winding 15. A change in magnetizing force, however, due to the change in ampere turns of windings 13 and 14, caused by a ground-fault current, creates a detectable change in the voltage output. Thus, so long as the current flowing in the conductor connected from winding 13 to the load 22 is equal to the current in winding 14, so that there is no ground fault from load 22 to some ground circuit, the magnetizing currents of windings 13 and 14 are equal and opposite. Thus, the output of winding 15 is a relatively low voltage sinusoidal output. If, however, there is a ground fault in the load 22, the current in windings 13 and 14 are not equal, but will differ from one another by the magnitude of the ground-fault current.

Thus, as shown in FIG. 2, a ground-fault current of 5 milliamperes will cause a change in magnetizing force of about 0.01 oersteds which produces a flux change of the order of 2,300 gauss. That is to say, under normal conditions and with no ground fault, the core 10 would be magnetized to a point of dotted line 30 which is about 700 gauss. Since the core 10 is excited so that it is operating on a sharp slope, and if there is an additional 5 milliampere ground fault, the additional magnetizing force will drive the core to a flux density of 3,000 gauss. This will then generate the flux change ΔB which will create a voltage output at windings significantly different from the normal voltage output therefrom. Note that the biasing current in winding 12 supplies all of the necessary ampere turns required to overcome the core losses of core 10. Thus, windings 13 and 14 will respond directly to current differences due to small ground-fault currents without being unnecessarily large.

The output winding 15 may be connected to any suitable output signal indicating circuit. FIg. 1 illustrates a preferred connection for output winding 15 which includes operational amplifier 40 which is, in turn, connected to operate a transistor 41 in trigger fashion. That is to say, the output of operational amplifier 40 is connected to the base of transistor 41. The collector and emitter electrodes of transistor 41 are connected in series with the positive terminal 42 of a suitable power supply. When the output signal of winding 15 indicates a ground fault, the output of operational amplifier 40 increases beyond its normal change due only to the biasing winding 12. This increases the base drive of transistor 41 such that transistor 41 conducts, thereby to produce an output pulse on output terminals 43 and 44. In this operation, it will be noted that transistor 41 is used as a level detector and discriminates between output induced by the bias current in winding 12 and the output produced by the leakage ground current. It will be obvious that any type of switching device could be used in place of transistor 41 and, moreover, it will be obvious that the output pulse at terminals 43 and 44 can be used to operate devices which interrupt the flow of current to load 22 in response to detection of a ground-fault current.

Figure 3:
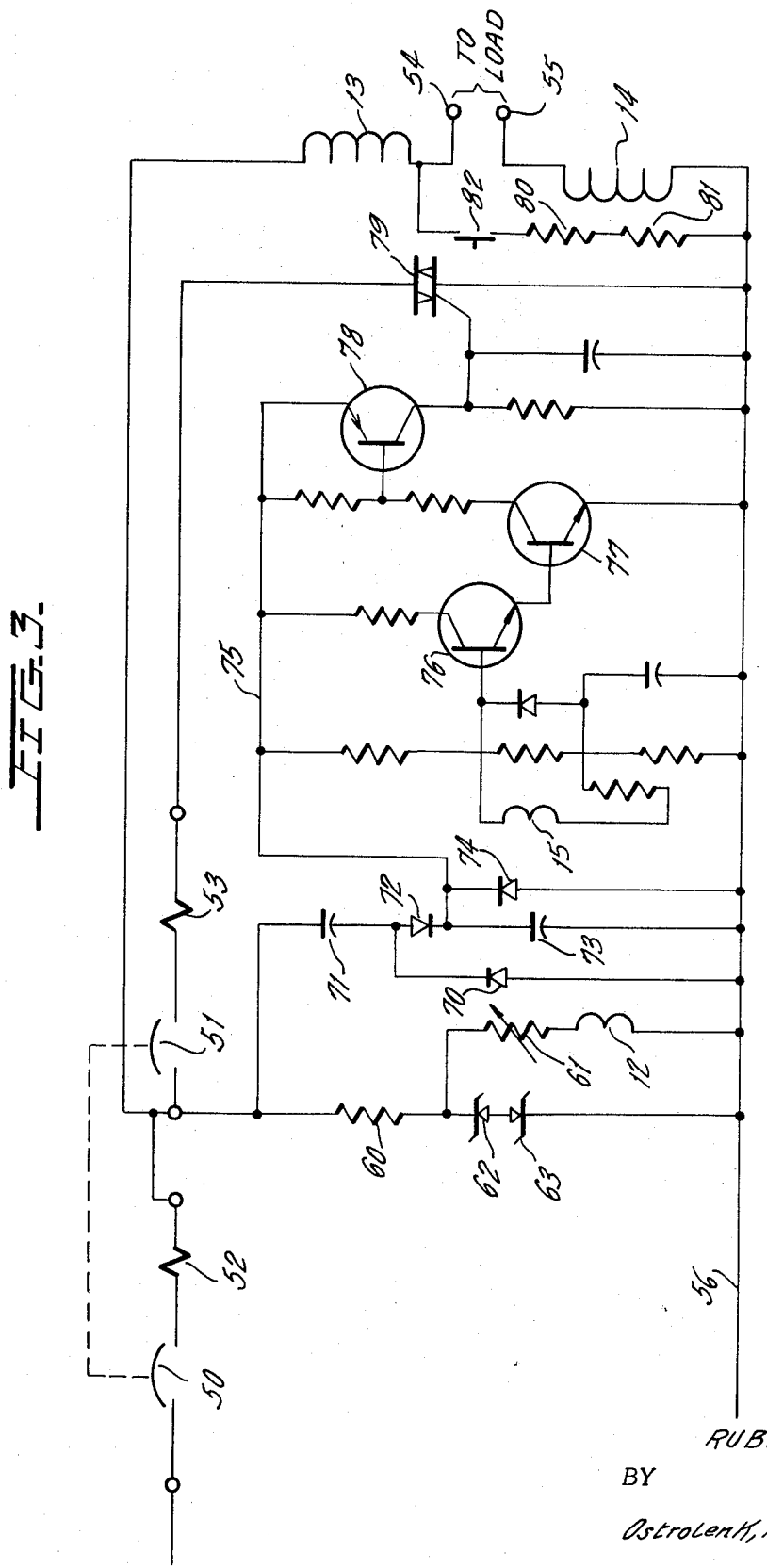
FIG. 3 is a circuit diagram of one detailed embodiment of the invention of FIG. 1.

FIG. 3 shows a diagram of a more detailed circuit which carries out the principles of the present invention. Referring to FIG. 3, there is illustrated a circuit interrupter containing two poles 50 and 51, wherein pole 50 is provided with a conventional series trip coil 52, while pole 51 has a coil 53 which operates as a shunt trip coil. Poles 50 and 51 are ganged together as illustrated by the dotted lines. Pole 50 is then connected in series with a load circuit which will be connected between terminals 54 and 55. Terminal 55 is connected to the return line 56 for the input power circuit supplying the load power.

The windings of a core which may be identical to the core of FIG. 1 are shown in FIG. 3 with similar identifying numerals. Thus, windings 13 and 14 are connected in series with the load terminals 54 and 55 and in series with pole 50 and series coil 52 and return line 56. The biasing winding 12 is then shown as connected directly across the output line and in series with resistor 60 and adjustable resistor 61. A pair of zener diodes 62 and 63 serve to form a clipped square wave voltage for bias winding 12, such that the biasing of winding 12 is independent of fluctuations in the AC line voltage. The bias current is adjusted by adjustment of resistor 61.

In order to produce a source of positive voltage supply, there is provided a full wave rectifier consisting of diodes 70 and 72 and filter capacitors 71 and 73. Zener diode 74 fixes the DC voltage produced by diode 62 on the bus 75.

The output of winding 15 is then connected into the base circuit of transistor 76 which, in combination with transistor 77 and other components in FIG. 3, define a conventional operational amplifier which may be designed to produce an amplification factor of 10. The output of the operational amplifier circuitry is then connected into the base of switching transistor 78 which serves a function similar to that of transistor 41 of FIG. 1, with the output of transistor 78 being connected to the gate of triac device 79. Triac 79 is then connected in series with pole 51 and shunt trip coil 53 of pole 51 such that the conduction of triac 79 will cause the energization of the shunt coil 53 and, therefore, the opening of pole 51 and pole 50 which is ganged thereto.

In order to simulate a ground-fault current, the circuit including resistors 80 and 81 and switch 82 are connected across the load terminals 54 and 55 and winding 14. Thus, the connection of switch 82 will appear to be a ground fault causing a given difference in current magnitude of the currents in windings 13 and 14. This operation, as in the case of a genuine ground fault, will then cause the generation of an increased voltage output of the output winding 15 so that the output of the operational amplifier including transistors 76 and 77 will cause the switching operation of transistor 78. Note that the normal output level of winding 15 is not by itself sufficient to cause this switching operation of transistor 78. The switch of transistor 78 produces an output pulse which operates triac 79, thereby to operate pole 51 through shunt coil 53 which, in turn, opens pole 50 so that the input line is disconnected from the load connected to terminals 54 and 55.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A ground-fault detection circuit comprising, in combination:
   a core of square hysteresis loop material;
   biasing winding means, output winding means, and first and second control windings wound on said core;
   said first and second control windings having respective first terminals connectable to a power source and having respective second terminals connectable to opposite sides of a load circuit which is to be monitored for a ground-fault condition; said first and second control windings being wound to generate opposing magnetomotive forces within said core when said first and second windings conduct current between said first terminals and a load circuit;
   said biasing winding means being energized by connecting first and second input terminals thereof to a power source, with said first input terminal being connected to said first terminal of said first control winding;
   an output signal generating means; said output winding means having output terminals connected to said output signal generating means;
   said output winding means having a first relatively low voltage level induced therein by the magnetizing force of said biasing winding when the magnetizing forces generated by load currents in said first and second control windings are equal and opposite; said output winding means having a second relatively high voltage level induced therein when the current through said first and second control windings differ by a ground-fault current having a relatively small magnitude;
   said output signal generating means being operative responsive to the development in said output winding means at and above said second voltage level, and being inoperative when the output of said output winding means is at said second voltage level.

2. The detection circuit of claim 1 wherein the ground-fault current magnitude required to operate said output signal generating means is about 5 milliamperes.

3. The detection circuit of claim 1 wherein said output signal generating means comprises an operational amplifier.

4. The detection circuit of claim 1 which includes circuit interrupter means in series with said first and second input terminals, and trip means for automatically operating said circuit interrupter means; said output signal generating means being connected to said trip means.

5. The detection circuit of claim 4 wherein said circuit interrupter means contains automatic trip means for automatically operating said circuit interrupter means in response to a given overcurrent; said relatively small magnitude ground-fault current being substantially smaller than said given overcurrent.

6. The detection circuit of claim 1 which includes test circuit means connected from said second terminal of said first control winding to said first terminal of said second winding; said test circuit means comprising an impedance means and a switching means in series therewith; said switching means being operable to a closed position, thereby to conduct current through said impedance means of a magnitude of a ground-fault current which is to be detected by said detection circuit.

7. The detection circuit of claim 6 wherein the ground-fault current magnitude required to operate said output signal generating means is about 5 milliamperes.

* * * * *